United States Patent
Urakata et al.

(10) Patent No.: US 12,434,923 B2
(45) Date of Patent: Oct. 7, 2025

(54) POWDER SUPPLY HOPPER PRESSURIZING APPARATUS, GASIFIER UNIT, INTEGRATED GASIFICATION COMBINED CYCLE AND CONTROL METHOD OF POWDER SUPPLY HOPPER PRESSURIZING APPARATUS

(71) Applicant: MITSUBISHI HITACHI POWER SYSTEMS, LTD., Yokohama (JP)

(72) Inventors: Yuichiro Urakata, Kanagawa (JP); Jun Kasai, Kanagawa (JP); Koji Nishimura, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 801 days.

(21) Appl. No.: 16/971,074

(22) PCT Filed: Feb. 15, 2019

(86) PCT No.: PCT/JP2019/005526
§ 371 (c)(1),
(2) Date: Aug. 19, 2020

(87) PCT Pub. No.: WO2019/163664
PCT Pub. Date: Aug. 29, 2019

(65) Prior Publication Data
US 2020/0391962 A1    Dec. 17, 2020

(30) Foreign Application Priority Data
Feb. 23, 2018    (JP) .................................. 2018-031062

(51) Int. Cl.
*B65G 53/66* (2006.01)
*B65G 65/40* (2006.01)
(Continued)

(52) U.S. Cl.
CPC ............. *B65G 53/66* (2013.01); *B65G 65/40* (2013.01); *C10J 3/50* (2013.01); *F02C 3/28* (2013.01);
(Continued)

(58) Field of Classification Search
CPC ........ C10J 3/50; C10J 2200/156; C10J 3/506; C10J 2200/15; C10J 2200/152; B65G 53/66; B65G 53/22
See application file for complete search history.

(56) References Cited

U.S. PATENT DOCUMENTS 1,319,193 A * 10/1919 Von Porat .............. B65G 53/22
                                                        406/142
3,689,045 A *  9/1972 Coulter ................... C21B 5/003
                                                         75/460
(Continued)

FOREIGN PATENT DOCUMENTS

CN    102212628 A    10/2011
CN    102758465 A    10/2012
(Continued)

OTHER PUBLICATIONS

International Search Report dated May 7, 2019, issued in counterpart International Application No. PCT/ JP2019/005526 with English translation (3 pages).
(Continued)

*Primary Examiner* — Imran Akram
(74) *Attorney, Agent, or Firm* — WHDA, LLP

(57) ABSTRACT

A powder supply hopper pressurizing apparatus including a first buffer tank in which pressurizing gas to be supplied to a powder supply hopper is accumulated at a predetermined pressure, a second buffer tank, a lower part pressure adjustment nitrogen system connected to the powder supply hopper, to supply the gas toward powder fuel stored in the (Continued)

powder supply hopper when supplying the powder fuel to a burner, and a control unit that controls the first buffer tank to pressurize the powder supply hopper to a first pressure and then controls the second buffer tank to pressurize the powder supply hopper to a second pressure, and where the control unit determines that one of the first buffer tank or the second buffer tank is non-usable, the control unit pressurizes the powder supply hopper by use of the first or second buffer tank that is operable, and the gas supply system.

6 Claims, 6 Drawing Sheets

(51) Int. Cl.
   *C10J 3/50* (2006.01)
   *F02C 3/28* (2006.01)
(52) U.S. Cl.
   CPC ..... *B65G 2203/042* (2013.01); *C10J 2200/15* (2013.01)

(56) References Cited

U.S. PATENT DOCUMENTS

| | | | | |
|---|---|---|---|---|
| 4,381,897 | A * | 5/1983 | Arbeletche | C21B 5/003 406/127 |
| 4,880,142 | A * | 11/1989 | Higuchi | G01G 13/248 706/900 |
| 5,123,632 | A * | 6/1992 | Schmit | C21B 5/003 75/460 |
| 5,284,187 | A * | 2/1994 | Schmit | C21B 5/003 141/286 |
| 5,285,735 | A * | 2/1994 | Motoi | F23K 3/02 110/101 CC |
| 2003/0232132 | A1 * | 12/2003 | Muehlberger | C23C 24/04 427/427 |
| 2012/0257934 | A1 * | 10/2012 | Kretschmer | C10J 3/723 406/14 |
| 2012/0325128 | A1 * | 12/2012 | Frisch | C10J 3/506 110/264 |
| 2012/0325129 | A1 * | 12/2012 | Frisch | C10J 3/78 110/263 |
| 2013/0298465 | A1 | 11/2013 | Kizu et al. | |
| 2014/0090583 | A1 * | 4/2014 | Hannemann | C10B 31/00 110/104 R |
| 2014/0234034 | A1 * | 8/2014 | Shimono | B65G 53/66 406/127 |
| 2014/0270993 | A1 * | 9/2014 | Stevenson | F02C 3/28 406/14 |
| 2015/0204610 | A1 * | 7/2015 | Mahowald | F27D 3/0033 406/146 |
| 2017/0283720 | A1 | 10/2017 | Schmit et al. | |
| 2019/0031430 | A1 * | 1/2019 | Urakata | B65D 88/28 |

FOREIGN PATENT DOCUMENTS

| | | |
|---|---|---|
| CN | 103450944 A | 12/2013 |
| CN | 203332973 U | 12/2013 |
| CN | 203360397 U | 12/2013 |
| CN | 204125430 U | 1/2015 |
| JP | 62-285990 A | 12/1987 |
| JP | 7-126664 A | 5/1995 |
| JP | 2004-35913 A | 2/2004 |
| JP | 2010-254382 A | 11/2010 |
| JP | 5362422 B2 | 12/2013 |
| JP | 2017-141073 A | 8/2017 |
| JP | 2017-532266 A | 11/2017 |
| WO | 2012/115054 A1 | 8/2012 |
| WO | WO-2017138488 A1 * | 8/2017 ............. B65D 88/28 |

OTHER PUBLICATIONS

Written Opinion in Japanese dated May 7, 2019, issued in counterpart International Application No. PCT/JP2019/005526 (3 pages).
Office Action dated May 20, 2021, issued in counterpart CN application No. 201980014266.2, with English translation. (18 pages).

* cited by examiner

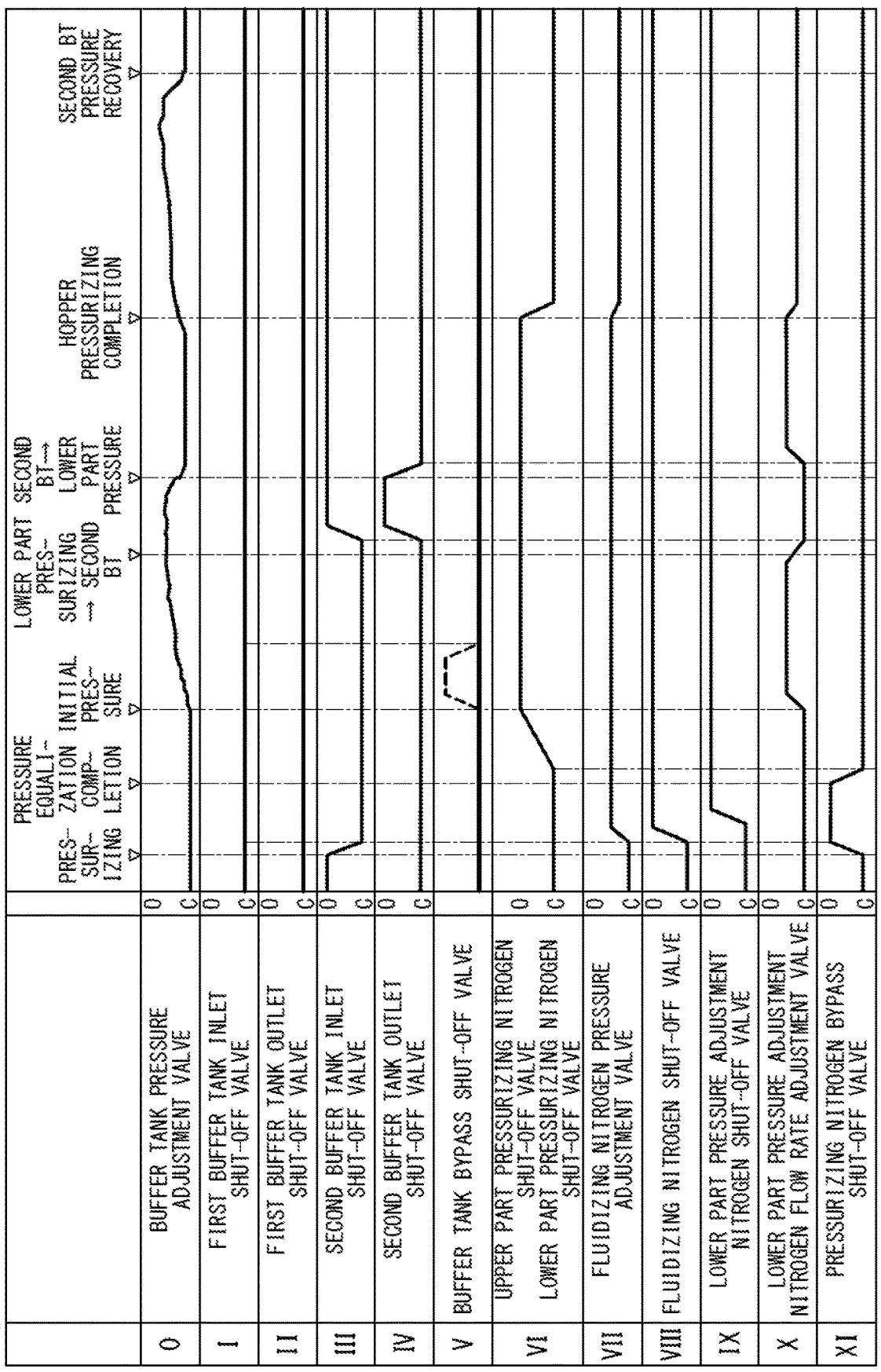

POWDER SUPPLY HOPPER PRESSURIZING APPARATUS, GASIFIER UNIT, INTEGRATED GASIFICATION COMBINED CYCLE AND CONTROL METHOD OF POWDER SUPPLY HOPPER PRESSURIZING APPARATUS

TECHNICAL FIELD

The present invention relates to a powder supply hopper pressurizing apparatus that pressurizes a powder supply hopper, a gasifier unit, an integrated gasification combined cycle and a control method of a powder supply hopper pressurizing apparatus.

BACKGROUND ART

Heretofore, as a gasifier unit, there has been known a carbonaceous feedstock gasification unit (a coal gasification unit) that supplies a carbonaceous feedstock of coal or the like into a gasifier, partially combusts the carbonaceous feedstock, and gasifies the fuel to generate combustible gas.

In the gasifier unit, coal is used as raw coal of a raw material, and a pressurizing apparatus that pressurizes a pulverized coal supply hopper to supply pulverized coal is known (Patent Citation 1). In the citation, two buffer tanks that temporarily store pressurizing nitrogen are provided in parallel. A pulverized coal supply hopper is pressurized to a predetermined pressure by use of one of the buffer tanks, and then the pulverized coal supply hopper is pressurized to a target pressure by use of the other buffer tank.

CITATION LIST

Patent Literature

[PTL 1]
Japanese Unexamined Patent Application, Publication No. 2017-141073

SUMMARY OF INVENTION

Technical Problem

However, a pressurizing apparatus described in the above citation is established in a case where a normal operation of each of two buffer tanks is possible. If one of the buffer tanks indicates an abnormality and becomes non-usable, for example, supply of pressurizing nitrogen from the buffer tank and pressurizing to the buffer tank are repeatedly performed to cope with such a case. Thus, much time is required to pressurize a pulverized coal supply hopper to a target pressure. Therefore, in such a case, there is a problem that a gasifier has to be operated with a lowered operation pressure and a low load.

Furthermore, at a tip of a pressure nozzle that supplies pressurizing gas to the pulverized coal supply hopper, a filter made of, for example, a sintered metal having more strength than a metal mesh is provided to face the pulverized coal stored in the pulverized coal supply hopper. For the filter of the pressure nozzle provided in the pulverized coal supply hopper, there is concern that in a case where damage occurs on the filter for a reason such as excessive-speed flow of the pressurizing gas, the pulverized coal intrudes into the pressure nozzle to induce another defect. However, a plurality of filters are used, and hence if damage occurs on one or more of the filters, it is not easy to detect the filter damage, and a damage detecting means is not provided. Therefore, if an operator does not usually monitor a flow state of the pulverized coal in the pulverized coal supply hopper carefully, the filter damage cannot be found until the pulverized coal supply hopper is opened and inspected. Therefore, a timing to arrange replacement parts delays after the damage is found by the inspection or the like, and much time may be taken for recovery.

The present disclosure has been developed in view of such situations, and provides a powder supply hopper pressurizing apparatus, a gasifier unit, an integrated gasification combined cycle and a control method of a powder supply hopper pressurizing apparatus for an object of pressurizing a powder supply hopper to a target pressure even in a case where one of two buffer tanks becomes non-usable.

Another object is to detect damage on a filter attached to a tip of a pressure nozzle during an operation.

Solution to Problem

A powder supply hopper pressurizing apparatus according to an aspect of the present invention comprises a first buffer tank in which pressurizing gas to be supplied to a powder supply hopper that supplies pressurized powder fuel is accumulated at a predetermined pressure, a second buffer tank that is provided in parallel with the first buffer tank and in which the pressurizing gas to be supplied to the powder supply hopper is accumulated at a predetermined pressure, a gas supply system connected to the powder supply hopper, to supply the pressurizing gas toward the powder fuel stored in the powder supply hopper when supplying the pressurized powder fuel, and a control unit that controls the first buffer tank to pressurize the powder supply hopper to a first pressure and then controls the second buffer tank to pressurize the powder supply hopper to a second pressure, wherein in a case where the control unit determines that one of the first buffer tank or the second buffer tank is non-usable, the control unit pressurizes the powder supply hopper by use of the first buffer tank or the second buffer tank that is operable, and the gas supply system.

The powder supply hopper, into which the powder fuel is supplied at an atmospheric pressure, is then pressurized to a target pressure. During the pressurizing, the powder supply hopper is pressurized to the first pressure by the pressurizing gas of the first buffer tank and is then pressurized to the second pressure (e.g., the target pressure) by the pressurizing gas of the second buffer tank. Therefore, in a case where one of the buffer tanks indicates the abnormality and it is therefore determined that the first buffer tank or the second buffer tank is non-usable, an interior of the powder supply hopper cannot be pressurized to the target pressure. For example, the supply of the pressurizing gas from the buffer tank and the pressurizing to the buffer tank are repeatedly performed to cope with such a case. Much time is required until the powder supply hopper is pressurized to the target pressure. To solve the problem, in a case where one of the buffer tanks is determined to be non-usable, the powder supply hopper is pressurized using the gas supply system that supplies the pressurized gas toward the powder fuel stored in the powder supply hopper when supplying the powder fuel. That is, the gas supply system for use to supply the powder fuel from the pressurized powder supply hopper and for use to additionally supply conveyance gas that fluidizes the powder fuel deposited close to a wall surface of the powder supply hopper during a normal operation is also used as a pressurizing gas supply system to pressurize the powder supply hopper. Consequently, even in a case where the first buffer tank or the second buffer tank is determined to be non-usable, the powder supply hopper can be pressurized to the target pressure.

Furthermore, the powder supply hopper pressurizing apparatus according to an aspect of the present invention further comprises a pressurizing gas manufacturing device that supplies the pressurizing gas to the first buffer tank, the second buffer tank and the gas supply system, a first buffer tank inlet valve provided on a pressurizing gas manufacturing device side of the first buffer tank, a first buffer tank outlet valve provided on a powder supply hopper side of the first buffer tank, a second buffer tank inlet valve provided on a pressurizing gas manufacturing device side of the second buffer tank, and a second buffer tank outlet valve provided on a powder supply hopper side of the second buffer tank, wherein the control unit determines that the first buffer tank is non-usable when an abnormality occurs in the first buffer tank inlet valve or the first buffer tank outlet valve, and determines that the second buffer tank is non-usable when an abnormality occurs in the second buffer tank inlet valve or the second buffer tank outlet valve.

The control unit determines that the buffer tank connected to its inlet valve or outlet valve is non-usable, when the abnormality occurs in the inlet valve or outlet valve of the buffer tank. Consequently, the control unit can determine that one of the buffer tanks is non-usable, and hence an operator does not have to judge operation load adjustment of the powder supply hopper pressurizing apparatus or a gasifier of a supply destination of the powder fuel.

Furthermore, the powder supply hopper pressurizing apparatus according to an aspect of the present invention further comprises a buffer tank pressure adjustment valve provided between the pressurizing gas manufacturing device, and the first buffer tank inlet valve and the second buffer tank inlet valve, to adjust a pressure to be supplied to the first buffer tank and the second buffer tank, wherein the control unit controls the buffer tank pressure adjustment valve to a closed state, when pressurizing the powder supply hopper by use of at least the gas supply system.

While the powder supply hopper is pressurized using the gas supply system, the pressurizing gas manufactured in the pressurizing gas manufacturing device is consumed. At this time, at least the buffer tank pressure adjustment valve is closed, and any pressurizing gas is not guided to the first buffer tank and the second buffer tank. Consequently, there is an upper limit amount to a supply amount of the pressurizing gas manufactured in the pressurizing gas manufacturing device, and hence the pressurizing gas manufactured in the pressurizing gas manufacturing device can be supplied mainly to the gas supply system. It can be avoided that an original pressure in a pressurizing gas outlet of the pressurizing gas manufacturing device drops and that the supply of the pressurizing gas runs short.

Furthermore, the powder supply hopper pressurizing apparatus according to an aspect of the present invention further comprises a plurality of pressure nozzles that supply the pressurizing gas to the powder supply hopper, a plurality of filters provided at tips of the pressure nozzles, respectively, to face a space of the powder supply hopper in which the powder fuel is stored and to pass the pressurizing gas therethrough, a powder supply hopper pressure sensor that detects a pressure in the powder supply hopper, and a pressurizing gas pressure sensor that detects a pressure on an upstream side of a branch point of the pressurizing gas to be branched at the branch point and supplied to the pressure nozzles, wherein the control unit determines that damage occurs on the filters, in a case where a differential pressure between the pressure detected by the powder supply hopper pressure sensor and the pressure detected by the pressurizing gas pressure sensor is equal to or less than a predetermined value.

The filters made of a porous sintered metal and provided at the tips of the plurality of pressure nozzles, respectively, provided on the powder supply hopper might be damaged, for example, due to wear or crack caused by sudden change in gas flow speed. Pressure loss in the filters decreases. Specifically, if the damage occurs on the filters due to the wear, crack or the like, the pressure loss in the filters decreases. However, a large number of filters are present, and hence it is not easy to detect the occurrence of the damage when the damage occurs on one or more of the filters.

As a result of observation, inventors pay attention to a differential pressure between a pressure of pressurizing gas of a mother tube upstream of a branch point to supply the pressurizing gas and a pressure in the powder supply hopper. It can be found that this differential pressure changes, when the damage occurs on one or more filters among a large number of existing filters.

Therefore, it is determined that the filter damage occurs, in a case where the differential pressure between the pressure in the powder supply hopper and the pressure of the pressurizing gas is equal to or less than the predetermined value. Consequently, a worker does not have to visually check the filters, and can prepare replacement parts at appropriate timing.

Furthermore, a gasifier unit according to an aspect of the present invention comprises the powder supply hopper pressurizing apparatus according to any one of the above aspects, and a gasifier to which the powder fuel is supplied from the powder supply hopper pressurizing apparatus.

Additionally, an integrated gasification combined cycle according to an aspect of the present invention comprises the above gasifier unit, a gas turbine that combusts at least a part of raw syngas obtained by the gasifier unit to rotate and drive, a steam turbine that rotates and drives with steam generated by a heat recovery steam generator into which turbine flue gas discharged from the gas turbine is introduced, and a generator rotatably coupled to the gas turbine and/or the steam turbine.

Furthermore, according to an aspect of the present invention, provided is a control method of a powder supply hopper pressurizing apparatus comprising a first buffer tank in which pressurizing gas to be supplied to a powder supply hopper that supplies pressurized powder fuel is accumulated at a predetermined pressure, a second buffer tank that is provided in parallel with the first buffer tank and in which the pressurizing gas to be supplied to the powder supply hopper is accumulated at a predetermined pressure, and a gas supply system connected to the powder supply hopper, to supply the pressurizing gas toward the powder fuel stored in the powder supply hopper when supplying the pressurized powder fuel, the control method of the powder supply hopper pressurizing apparatus, comprising controlling the first buffer tank to pressurize the powder supply hopper to a first pressure, and then controlling the second buffer tank to pressurize the powder supply hopper to a second pressure, and in a case where it is determined that one of the first buffer tank or the second buffer tank is non-usable, pressurizing the powder supply hopper by use of the first buffer tank or the second buffer tank that is operable, and the gas supply system.

Advantageous Effect of Invention

A powder supply hopper is pressurized using a gas supply system, and hence the powder supply hopper can be pressurized to a target pressure even in a case where one of two buffer tanks is determined to be non-usable.

BRIEF DESCRIPTION OF DRAWINGS

FIG. 6 is a timing chart showing a pressurizing step in a case where a first buffer tank is determined to be non-usable.

DESCRIPTION OF EMBODIMENTS

Hereinafter, description will be made as to embodiments according to the present invention with reference to the drawings.

First Embodiment

Figure 1:
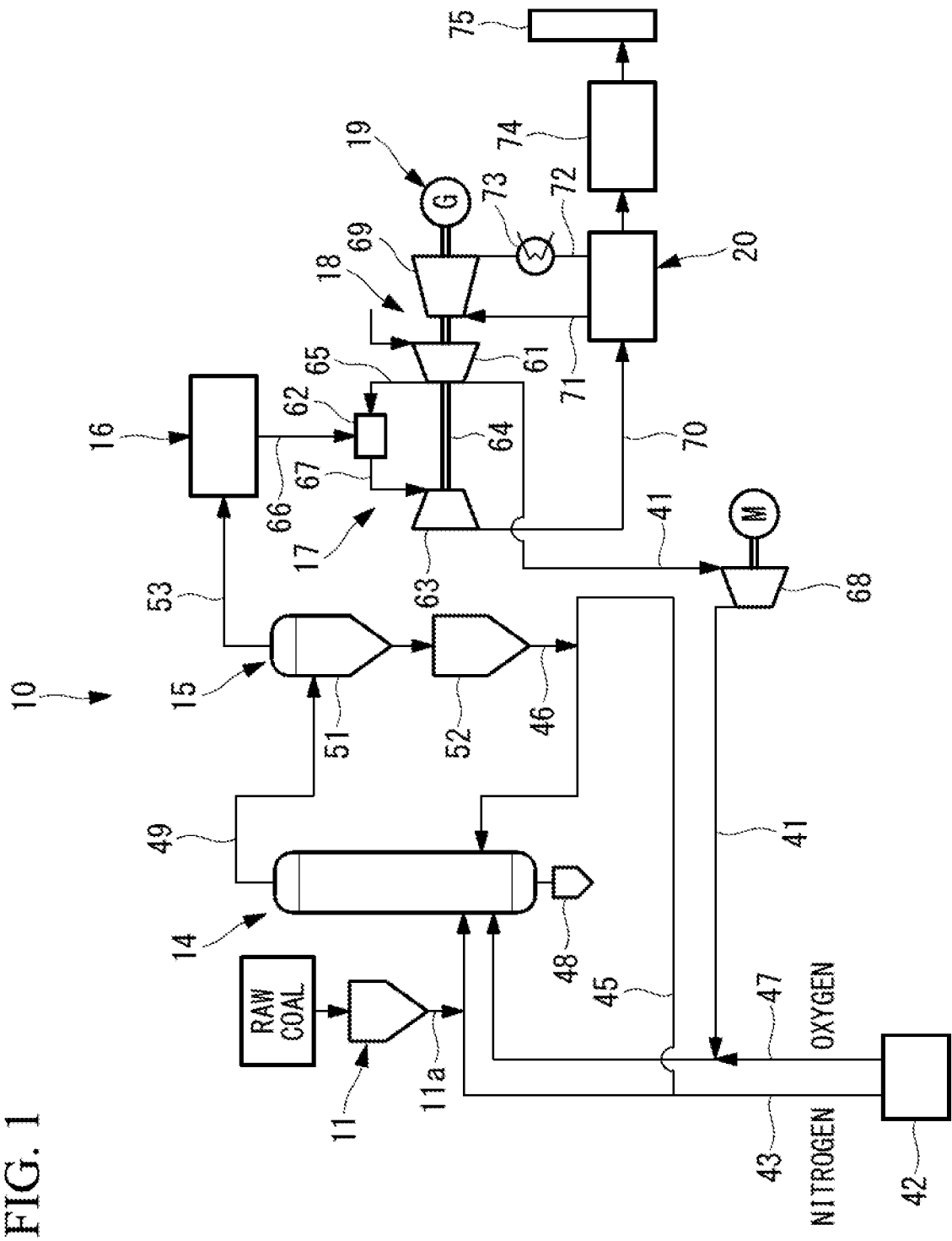
FIG. 1 is a schematic configuration diagram showing an integrated coal gasification combined cycle according to a first embodiment of the present invention.

FIG. 1 shows a schematic configuration of an integrated coal gasification combined cycle 10 to which a gasifier unit 14 is applied.

In the integrated coal gasification combined cycle (IGCC) 10, an air-based oxygen containing gas is used, and in the gasifier unit 14, an air combustion system that generates combustible gas (raw syngas) from fuel is employed. Then, in the integrated coal gasification combined cycle 10, the raw syngas obtained in the gasifier unit 14 is purified in a gas clean-up unit 16 to obtain fuel gas, which is then supplied to a gas turbine 17 to generate power. That is, the integrated coal gasification combined cycle 10 serves as an air combustion type (air blowing) power generation unit. As the fuel to be supplied to the gasifier unit 14, for example, carbonaceous feedstock of coal or the like is used.

As shown in FIG. 1, the integrated coal gasification combined cycle (the integrated gasification combined cycle) 10 includes a coal supply unit 11, the gasifier unit 14, a char recovery unit 15, the gas clean-up unit 16, the gas turbine 17, a steam turbine 18, a generator 19, and a heat recovery steam generator (HRSG) 20.

In the coal supply unit 11, coal that is the carbonaceous feedstock is supplied as raw coal, and pulverized with a coal pulverizer (not shown) or the like, to manufacture pulverized coal (powder fuel) pulverized in fine particles. The pulverized coal manufactured in the coal supply unit 11 is pressurized with nitrogen gas as a conveying inert gas supplied from an air separation unit 42 described later at an outlet of a coal supply line 11a, and supplied toward the gasifier unit 14. The inert gas is an inert gas having an oxygen content rate of about 5 vol % or less, and typical examples of the inert gas include nitrogen gas, carbon dioxide gas and argon gas. The rate is not necessarily limited to about 5 vol % or less.

The coal supply unit 11 comprises a pulverized coal supply hopper pressurizing apparatus (a powder supply hopper pressurizing apparatus) 1 according to the present embodiment. This apparatus will be described later in detail.

In the gasifier unit 14, the pulverized coal manufactured in the coal supply unit 11 is supplied, and char (powder fuel comprising an unreacted portion and ash of coal) recovered in the char recovery unit 15 is returned and supplied for a purpose of reuse.

Furthermore, the gasifier unit 14 is connected to a compressed air supply line 41 from the gas turbine 17 (a compressor 61), and a part of compressed air compressed in the gas turbine 17 is boosted up to a predetermined pressure in a booster 68, and can be supplied to the gasifier unit 14. The air separation unit 42 separates and generate nitrogen and oxygen from air in atmosphere, and a first nitrogen supply line 43 connects the air separation unit 42 to the gasifier unit 14. Then, the first nitrogen supply line 43 is connected to the coal supply line 11a from the coal supply unit 11. Furthermore, a second nitrogen supply line 45 branching from the first nitrogen supply line 43 is also connected to the gasifier unit 14, and the second nitrogen supply line 45 is connected to a char return line 46 from the char recovery unit 15. Furthermore, the air separation unit 42 is connected to the compressed air supply line 41 via an oxygen supply line 47. Then, nitrogen separated by the air separation unit 42 flows through the first nitrogen supply line 43 and the second nitrogen supply line 45, and is thereby utilized as a coal or char carrier gas. Furthermore, oxygen separated by the air separation unit 42 flows through the oxygen supply line 47 and the compressed air supply line 41, and is thereby utilized as an oxygen containing gas in the gasifier unit 14.

Figure 2:
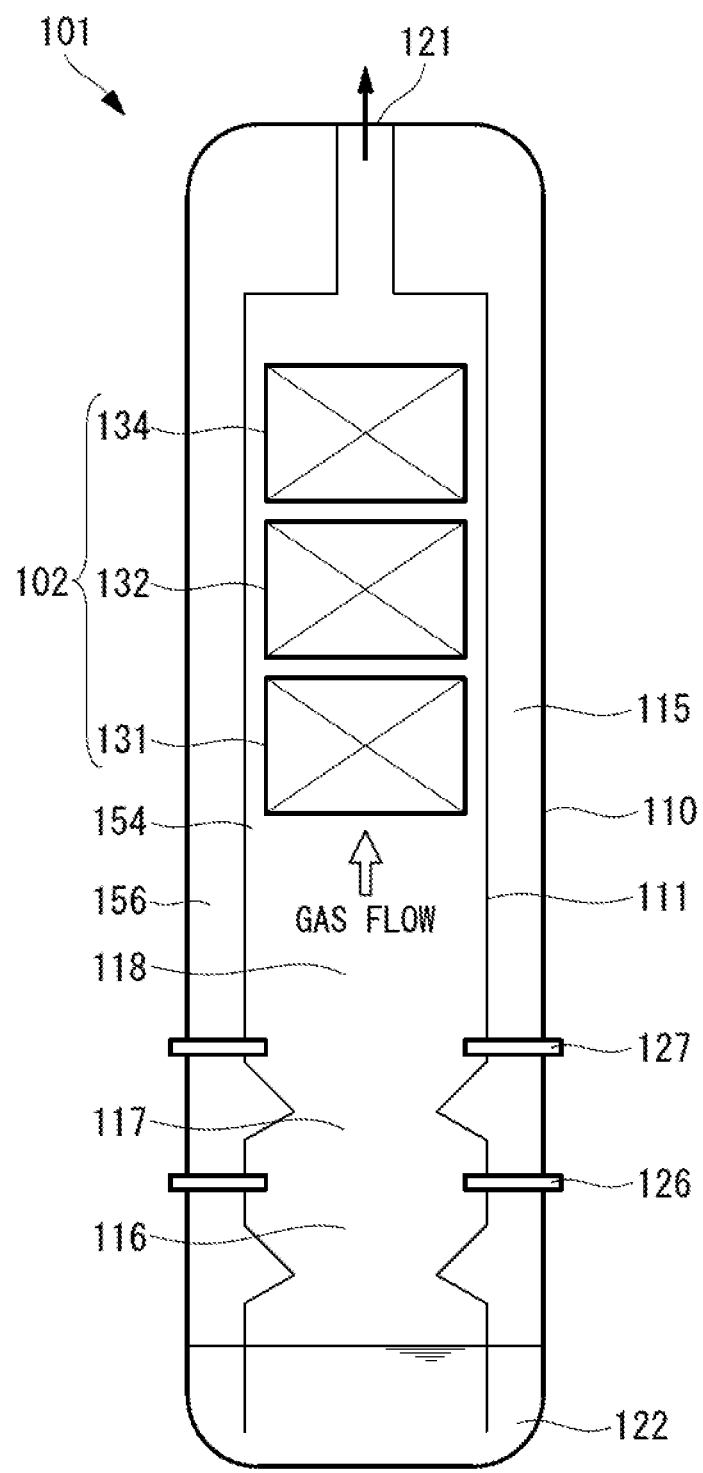
FIG. 2 is a schematic configuration diagram showing a gasifier unit of FIG. 1.

The gasifier unit 14 comprises, for example, a gasifier 101 of a two-stage entrained bed system (see FIG. 2). The gasifier unit 14 partially combusts and gasifies coal (the pulverized coal) and char supplied inside with the oxygen containing gas (air and oxygen) to obtain the raw syngas. Note that the gasifier unit 14 is provided with a foreign matter removal unit 48 that removes foreign matter (slag) mixed in the pulverized coal. Then, the gasifier unit 14 is connected to a gas generation line 49 that supplies the raw syngas toward the char recovery unit 15, and the raw syngas including the char can be discharged. In this case, as shown in FIG. 2, the gas generation line 49 is provided with a syngas cooler 102 (a gas cooler), so that the raw syngas may be cooled down to a predetermined temperature and then supplied to the char recovery unit 15.

The char recovery unit 15 comprises a dust collection unit 51 and a supply hopper 52. In this case, the dust collection unit 51 comprises one or more cyclones or porous filters, and can separate the char contained in the raw syngas obtained in the gasifier unit 14. Then, the raw syngas separated from the char is fed through a gas discharge line 53 to the gas clean-up unit 16. The supply hopper 52 stores the char separated from the raw syngas in the dust collection unit 51. Note that a bin may be disposed between the dust collection unit 51 and the supply hopper 52, and this bin may be connected to a plurality of supply hoppers 52. Then, the char return line 46 from the supply hopper 52 is connected to the second nitrogen supply line 45.

The gas clean-up unit 16 removes impurities such as a sulfur compound and a nitrogen compound from the raw syngas separated from the char by the char recovery unit 15, to purify the gas. Then, the gas clean-up unit 16 purifies the raw syngas to manufacture the fuel gas, and supplies this gas to the gas turbine 17. Note that the raw syngas separated from the char still contains a sulfur content ($H_2S$ or the like), and hence in the gas clean-up unit 16, the sulfur content is removed and recovered with an amine absorption liquid or the like, to effectively utilize the gas.

The gas turbine 17 comprises the compressor 61, a combustor 62, and a turbine 63, and the compressor 61 is coupled to the turbine 63 via a rotary shaft 64. The combustor 62 is connected to a compressed air supply line 65 from the compressor 61, is connected to fuel gas supply line 66 from the gas clean-up unit 16, and is also connected to a combustion gas supply line 67 extending toward the turbine 63. Furthermore, the gas turbine 17 is provided with the compressed air supply line 41 extending from the compressor 61 to the gasifier unit 14, and in a middle of the compressed air supply line, the booster 68 is provided. Therefore, in the combustor 62, a part of compressed air supplied from the compressor 61 and at least a part of the fuel gas supplied from the gas clean-up unit 16 are mixed and combusted to generate a combustion gas, and the generated combustion gas is supplied toward the turbine 63. Then, the turbine 63 rotates and drives the rotary shaft 64 with the supplied combustion gas to rotate and drive the generator 19.

The steam turbine 18 comprises a turbine 69 coupled to the rotary shaft 64 of the gas turbine 17, and the generator 19 is coupled to a base end of the rotary shaft 64. The heat recovery steam generator 20 is connected to a flue gas line 70 from the gas turbine 17 (the turbine 63), and heat exchange is performed between water to be supplied to the heat recovery steam generator 20 and flue gas of the turbine 63, to generate steam. Then, a steam supply line 71 is provided and a steam recovery line 72 is also provided between the heat recovery steam generator 20 and the turbine 69 of the steam turbine 18, and the steam recovery line 72 is provided with a condenser 73. Furthermore, the steam generated in the heat recovery steam generator 20 may include steam generated by heat exchange with the raw syngas in the syngas cooler 102 of the gasifier 101. Therefore, in the steam turbine 18, the turbine 69 rotates and drives with the steam supplied from the heat recovery steam generator 20, to rotate the rotary shaft 64 and thereby rotate and drive the generator 19.

A gas purification unit 74 is provided between an outlet of the heat recovery steam generator 20 and a stack 75.

Next, an operation of the integrated coal gasification combined cycle 10 will be described.

In the integrated coal gasification combined cycle 10, upon supply of the raw coal (the coal) to the coal supply unit 11, the coal is pulverized into fine particles in the coal supply unit 11 to obtain the pulverized coal. The pulverized coal manufactured in the coal supply unit 11 flows through the first nitrogen supply line 43 with nitrogen supplied from the air separation unit 42, and is supplied to the gasifier unit 14. Furthermore, the char recovered in the char recovery unit 15 described later flows through the second nitrogen supply line 45 with nitrogen supplied from the air separation unit 42, and is supplied to the gasifier unit 14. Furthermore, the compressed air extracted from the gas turbine 17 described later is boosted in the booster 68, and is then supplied, together with oxygen supplied from the air separation unit 42, through the compressed air supply line 41 to the gasifier unit 14.

In the gasifier unit 14, the supplied pulverized coal and char are combusted with the compressed air (oxygen), and the pulverized coal and char are gasified, to obtain the raw syngas. Then, this raw syngas is discharged from the gasifier unit 14 through the gas generation line 49, and fed to the char recovery unit 15.

In the char recovery unit 15, the raw syngas is first supplied to the dust collection unit 51, so that the fine particles of char contained in the raw syngas are separated. Then, the raw syngas separated from the char is fed through the gas discharge line 53 to the gas clean-up unit 16. On the other hand, the fine particles of char separated from the raw syngas are deposited in the supply hopper 52, and returned through the char return line 46 back to the gasifier unit 14, to be recycled.

In the gas clean-up unit 16, the impurities, such as the sulfur compound and the nitrogen compound, are removed from the raw syngas from which the char is separated by the char recovery unit 15, and the gas is purified to manufacture the fuel gas. The compressor 61 generates the compressed air and supplies the air to the combustor 62. The combustor 62 mixes the compressed air supplied from the compressor 61 and the fuel gas supplied from the gas clean-up unit 16, and combusts the mixed gas to generate the combustion gas. This combustion gas rotates and drives the turbine 63, to rotate and drive the compressor 61 and the generator 19 via the rotary shaft 64. Thus, the gas turbine 17 can generate the power.

Then, in the heat recovery steam generator 20, heat exchange is performed between the flue gas discharged from the turbine 63 in the gas turbine 17 and water to be supplied to the heat recovery steam generator 20, to generate the steam, and the generated steam is supplied to the steam turbine 18. In the steam turbine 18, the steam supplied from the heat recovery steam generator 20 rotates and drives the turbine 69, and the generator 19 rotates and drives via the rotary shaft 64, so that the power can be generated.

Note that the gas turbine 17 and the steam turbine 18 coaxially rotate and drive the one generator 19, and in place of this configuration, the turbines as separate axes may rotate and drive a plurality of generators.

Afterward, the gas purification unit 74 removes toxic substances from the exhaust gas discharged from the heat recovery steam generator 20, and the purified exhaust gas is released from the stack 75 to the atmosphere.

Next, description will be made in detail as to the gasifier unit 14 in the integrated coal gasification combined cycle 10 described above, with reference to FIG. 1 and FIG. 2.

As shown in FIG. 2, the gasifier unit 14 comprises the gasifier 101, and the syngas cooler 102.

The gasifier 101 is formed to extend in a vertical direction, and has a lower side in the vertical direction to which the pulverized coal and oxygen are supplied, and partially combusted. The gasified raw syngas flows from the lower side toward an upper side in the vertical direction. The gasifier 101 includes a pressure vessel 110, and a gasifier wall 111 provided in the pressure vessel 110. Then, in the gasifier 101, an annulus part 115 is formed in a space between the pressure vessel 110 and the gasifier wall 111. Furthermore, in the gasifier 101, a combustor part 116, a diffusor part 117 and a reductor part 118 are formed in order from the lower side in the vertical direction (i.e., an upstream side in a flow direction of the raw syngas) in a space in the gasifier wall 111.

The pressure vessel 110 is formed in a tubular shape having a hollow space therein, and a gas discharge port 121 is formed in an upper end, while a slag bath 122 is formed in a lower end (a bottom). The gasifier wall 111 is formed in a tubular shape having a hollow space therein, and a surface of the wall is provided opposite to an inner surface of the pressure vessel 110. In the present embodiment, the pressure vessel 110 has a cylindrical shape, and the diffusor part 117 of the gasifier wall 111 is also formed in a cylindrical shape.

Then, the gasifier wall 111 is coupled to the inner surface of the pressure vessel 110 with an unshown support member.

The gasifier wall 111 separates an interior of the pressure vessel 110 into an internal space 154 and an external space 156. The gasifier wall 111 has a transverse sectional shape that changes in the diffusor part 117 between the combustor part 116 and the reductor part 118. The gasifier wall 111 has an upper end on the vertical upper side connected to a gas discharge port 121 of the pressure vessel 110, and has a lower end on the vertical lower side provided via a space from the bottom of the pressure vessel 110. Then, water is stored in the slag bath 122 formed in the bottom of the pressure vessel 110, and the stored water enters into the lower end of the gasifier wall 111, to seal inside and outside the gasifier wall 111. Burners 126 and 127 are inserted in the gasifier wall 111, and the syngas cooler 102 is disposed in the internal space 154. A structure of the gasifier wall 111 will be described later.

The annulus part 115 is a space formed inside the pressure vessel 110 and outside the gasifier wall 111, i.e., the external space 156 to which nitrogen that is the inert gas separated in the air separation unit 42 is supplied through an unshown nitrogen supply line. Consequently, the annulus part 115 is a space filled with nitrogen. Note that in a vicinity of an upper portion of the annulus part 115 in the vertical direction, an unshown in-furnace pressure equalizing tube is provided to equalize a pressure in the gasifier 101. The in-furnace pressure equalizing tube is provided to communicate inside and outside the gasifier wall 111, and the pressure is almost equalized so that a difference in pressure between an interior of the gasifier wall 111 (the combustor part 116, the diffusor part 117 and the reductor part 118) and an exterior thereof (the annulus part 115) is within a predetermined pressure.

The combustor part 116 is a space to partially combust the pulverized coal, char and air, and in the gasifier wall 111 defining the combustor part 116, a combustion device comprising a plurality of burners 126 is disposed. High-temperature combustion gas with which the pulverized coal and a part of the char are combusted in the combustor part 116 passes through the diffusor part 117 to flow into the reductor part 118.

The reductor part 118 is a space that is maintained in a high-temperature state required for gasification reaction, and in the space, the pulverized coal is supplied to the combustion gas from the combustor part 116, partially combusted, decomposed into a volatile content (carbon monoxide, hydrogen, lower hydrocarbon or the like), and gasified to obtain the raw syngas. In the gasifier wall 111 defining the reductor part 118, a combustion device comprising a plurality of burners 127 is disposed.

The syngas cooler 102 is provided in the gasifier wall 111, and provided on an upper side of the burner 127 of the reductor part 118 in the vertical direction. The syngas cooler 102 is a heat exchanger, and is provided with an evaporator 131, a superheater 132, and an economizer 134 in order from a lower side of the gasifier wall 111 in the vertical direction (an upstream side in a flow direction of the raw syngas). Heat exchange is performed between the syngas cooler 102 and the raw syngas obtained in the reductor part 118, to cool the raw syngas. Furthermore, there are not any restrictions on a number of the evaporators 131, superheaters 132, or economizers 134 illustrated in the drawing.

The gasifier unit 14 described above operates as follows.

In the gasifier 101 of the gasifier unit 14, nitrogen and pulverized coal are thrown inside and ignited by the burner 127 of the reductor part 118, and the pulverized coal and char together with compressed air (oxygen) are thrown inside and ignited by the burner 126 of the combustor part 116. Then, in the combustor part 116, high-temperature combustion gas is generated by combustion of the pulverized coal and char. Furthermore, in the combustor part 116, molten slag is generated in the high-temperature gas by the combustion of the pulverized coal and char, and this molten slag adheres to the gasifier wall 111, drops down to a furnace bottom and is finally discharged to stored water in the slag bath 122. Then, the high-temperature combustion gas generated in the combustor part 116 rises through the diffusor part 117 to the reductor part 118. In the reductor part 118, the gas is maintained in a high-temperature state required for the gasification reaction, and the pulverized coal is mixed with the high-temperature combustion gas. The pulverized coal is partially combusted to perform the gasification reaction in a high-temperature reducing atmosphere, and the raw syngas is obtained. The gasified raw syngas flows from the lower side toward the upper side in the vertical direction.

[Pulverized Coal Supply Hopper Pressurizing Apparatus]

Figure 3:
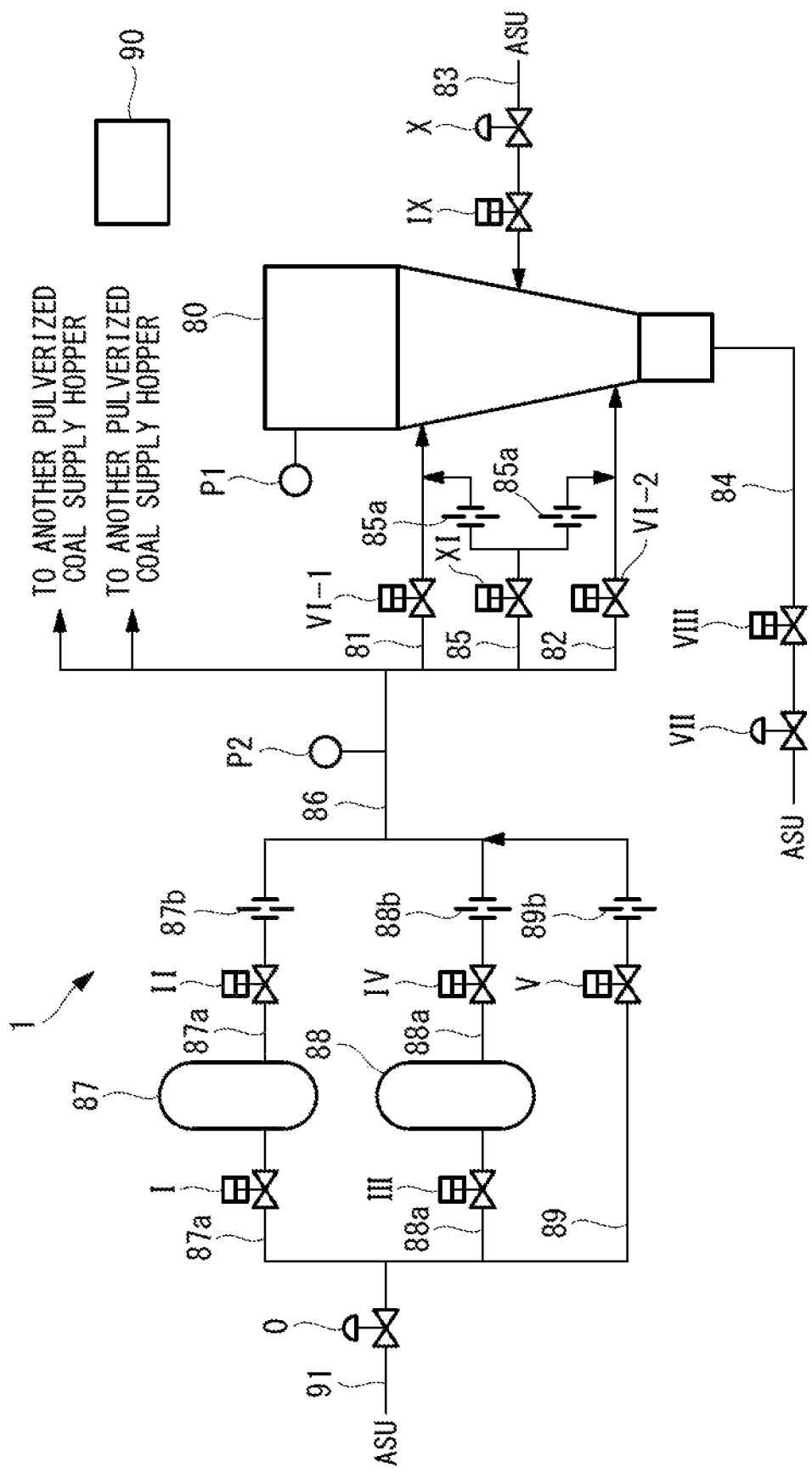
FIG. 3 is a schematic configuration diagram showing a pressurizing apparatus that pressurizes a pulverized coal supply hopper.

FIG. 3 shows a schematic configuration of the pulverized coal supply hopper pressurizing apparatus (the powder supply hopper pressurizing apparatus) 1 provided in the coal supply unit 11 shown in FIG. 1. The pulverized coal supply hopper pressurizing apparatus 1 pressurizes a pulverized coal supply hopper 80 (hereinafter, referred to as "the hopper 80") to a target pressure. The target pressure is a pressure required in supplying the pulverized coal to the burners 126, 127 of the gasifier 101, and is set to a predetermined pressure equal to or more than a pressure in the pressure vessel 110 (see FIG. 2) when the gasifier 101 is operated in the present embodiment.

A plurality of (e.g., three in the present embodiment) hoppers 80 are provided, and arranged in parallel with a pulverized coal supply destination of the gasifier unit 14. The respective hoppers 80 can be sequentially switched one by one so that the pulverized coal is supplied thereto at an atmospheric pressure and the pulverized coal pressurized during use is discharged therefrom. Therefore, in a case where the pulverized coal is discharged from one of the hoppers 80, the other hopper 80 is on standby for the discharge. Thus, the hoppers comprise the hopper to which the pulverized coal is supplied at the atmospheric pressure, and the hopper pressurized to the predetermined pressure so that the pulverized coal can be supplied.

The hopper 80 is provided with a hopper pressure sensor (a powder supply hopper pressure sensor) P1 to detect a pressure in the hopper 80. A detection output of the hopper pressure sensor P1 is transmitted to a control unit 90.

In a pressurizing gas to pressurize the hopper 80, nitrogen is used in the present embodiment. The hopper 80 is connected to an upper stage pressurizing nitrogen system 81, a lower stage pressurizing nitrogen system 82, a lower part pressure adjustment nitrogen system (a gas supply system) 83, and a fluidizing nitrogen system 84.

The upper stage pressurizing nitrogen system 81 is provided with an upper part pressurizing nitrogen shut-off valve VI-1. The lower stage pressurizing nitrogen system 82 is provided with a lower part pressurizing nitrogen shut-off valve VI-2. Each of the upper stage pressurizing nitrogen system 81 and the lower stage pressurizing nitrogen system 82 is connected to a pressurizing nitrogen bypass system 85 via an orifice 85a to restrict sudden increase in flow rate of fluidizing gas such as nitrogen gas when the shut-off valve is opened. The pressurizing nitrogen bypass system 85 is provided with a pressurizing nitrogen bypass shut-off valve XI.

The lower part pressure adjustment nitrogen system 83 is configured to apply, into the hopper 80, a pressure to convey the pulverized coal to an outlet in a bottom of the hopper 80 and to fluidize the pulverized coal stationarily deposited close to a wall surface of the hopper 80. Therefore, the lower part pressure adjustment nitrogen system 83 is for use in supplying the pulverized coal from the hopper 80 to a gasifier 101 side. Furthermore, in the present embodiment, the lower part pressure adjustment nitrogen system 83 is used to pressurize an interior of the hopper 80 from the atmospheric pressure to an operation pressure as described later. The lower part pressure adjustment nitrogen system 83 is provided with a lower part pressure adjustment nitrogen shut-off valve IX and a lower part pressure adjustment nitrogen flow rate adjustment valve X. The lower part pressure adjustment nitrogen system 83 on an upstream side is connected to an air separation unit (ASU) (a pressurizing gas manufacturing device), and hence nitrogen can be supplied with a large flow rate. However, there is an upper limit to an amount of nitrogen to be supplied by the ASU. Therefore, if nitrogen always continues to be used from the lower part pressure adjustment nitrogen system 83, a nitrogen supply original pressure in an ASU outlet might drop and the amount of nitrogen to be supplied might run short. Consequently, during the supply of nitrogen to the lower part pressure adjustment nitrogen system 83, it is important to decrease a nitrogen consumption amount in another system.

The fluidizing nitrogen system 84 is configured to fluidize the pulverized coal deposited around a pulverized coal outlet of the hopper 80. The fluidizing nitrogen system 84 is provided with a fluidizing nitrogen pressure adjustment valve VII and a fluidizing nitrogen shut-off valve VIII. The fluidizing nitrogen system 84 on the upstream side is connected to the ASU.

The upper stage pressurizing nitrogen system 81, the lower stage pressurizing nitrogen system 82 and the pressurizing nitrogen bypass system 85 on the upstream side are connected to a common mother tube 86. The mother tube 86 is provided with a mother tube pressure sensor (a pressurizing gas pressure sensor) P2 to detect a pressure in the mother tube 86. A detection output of the mother tube pressure sensor P2 is transmitted to the control unit 90.

A first buffer tank 87 and a second buffer tank 88 are provided on an upstream side of the mother tube 86. The first buffer tank 87 and the second buffer tank 88 are provided in parallel with each other. That is, a first buffer tank side nitrogen system 87a connected to the first buffer tank 87 and a second buffer tank side nitrogen system 88a connected to the second buffer tank 88 are provided in parallel, and connected to the common mother tube 86.

A first buffer tank inlet shut-off valve (a first buffer tank inlet valve) I is provided on an upstream side of the first buffer tank 87. On a downstream side of the first buffer tank 87, a first buffer tank outlet shut-off valve (a first buffer tank outlet valve) II and a first buffer tank side orifice 87b are provided in order from the upstream side, the orifice being provided to restrict sudden increase in flow rate of nitrogen or the like, when the first buffer tank outlet shut-off valve II is opened to discharge the pressurizing gas.

A second buffer tank inlet shut-off valve (a second buffer tank inlet valve) III is provided on an upstream side of the second buffer tank 88. On a downstream side of the second buffer tank 88, a second buffer tank outlet shut-off valve (a second buffer tank outlet valve) IV and a second buffer tank side orifice 88b are provided in order from the upstream side, the orifice being provided to restrict sudden increase in flow rate of nitrogen or the like, when the second buffer tank outlet shut-off valve IV is opened to discharge the pressurizing gas. A diameter of the second buffer tank side orifice 88b is larger than a diameter of the first buffer tank side orifice 87b. Consequently, pressurizing by the second buffer tank 88 to be performed after pressurizing by the first buffer tank 87 is performed immediately.

A buffer tank bypass system 89 is provided in parallel with the first buffer tank 87 and the second buffer tank 88. The buffer tank bypass system 89 on the downstream side is connected to the mother tube 86. The buffer tank bypass system 89 is provided with a buffer tank bypass shut-off valve V and a bypass side orifice 89b in order from the upstream side. A diameter of the bypass side orifice 89b is smaller than a diameter of the first buffer tank side orifice 87b.

The first buffer tank side nitrogen system 87a, the second buffer tank side nitrogen system 88a and the buffer tank bypass system 89 on the upstream side are connected to a common buffer tank pressurizing nitrogen system 91. The buffer tank pressurizing nitrogen system 91 on the upstream side is connected to the ASU. The buffer tank pressurizing nitrogen system 91 is provided with a buffer tank pressure adjustment valve O to adjust a pressure to be supplied to the first buffer tank 87 and the second buffer tank 88.

The respective valves O and I to XI described above are controlled by the control unit 90. The control unit 90 comprises, for example, a central processing unit (CPU), a random access memory (RAM), a read only memory (ROM), a computer readable storage medium and others. Then, a series of processing to achieve various functions is, for example, stored in a program form in the storage medium or the like, and the CPU reads this program to the RAM or the like, and executes processing and computation of information, to achieve various functions. Note that the program may be applied in a form of being installed beforehand in the ROM or another storage medium, a form of being provided in a state where the program is stored in the computer readable storage medium, a form of being distributed via a communication means in a wired or wireless manner, or the like. Examples of the computer readable storage medium include a magnetic disk, a magneto-optical disk, a CD-ROM, a DVD-ROM, and a semiconductor memory.

Figure 4:
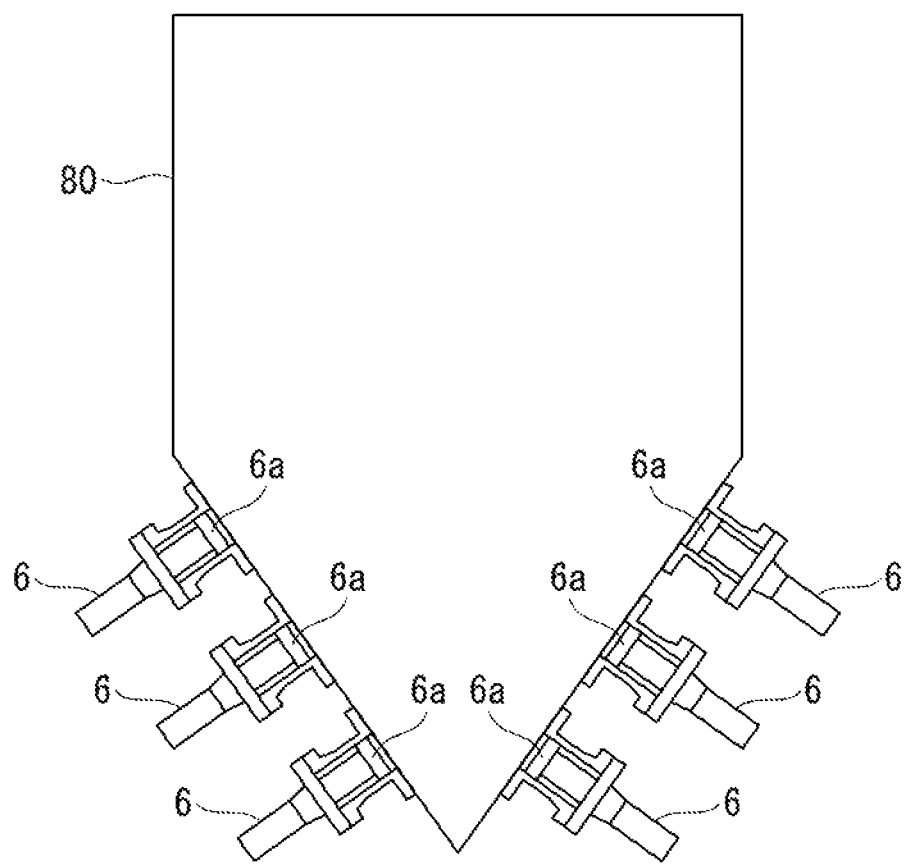
FIG. 4 is a schematic configuration diagram showing a pressure nozzle attached to the pulverized coal supply hopper.

FIG. 4 shows a plurality of pressure nozzles 6 provided on the hopper 80. The pressure nozzles 6 on the upstream side are connected to the upper stage pressurizing nitrogen system 81, the lower stage pressurizing nitrogen system 82, the lower part pressure adjustment nitrogen system 83 and the like. At tips of the pressure nozzles 6, filters 6a made of, for example, a porous sintered metal having more strength than a metal mesh are provided, respectively. The filters 6a face a space in which the pulverized coal is stored in the hopper 80, and pass the pressurizing gas, such as nitrogen, therethrough. The filters 6a prevent the pulverized coal in the hopper 80 from flowing backward and being mixed into the respective nitrogen systems (81, 82, and 83) described above.

Next, description will be made as to a pressurizing method in which the pulverized coal supply hopper pressurizing apparatus 1 described above is used. Note that in the following description, reference signs of the respective valves O and I to XI will be expressed with names omitted. For example, the first buffer tank inlet shut-off valve I will be referred to simply as "the valve I".

[Case where Both the Buffer Tanks are Normal]

First, description will be made as to a case where the first buffer tank 87 and the second buffer tank 88 can be normally used, e.g., a case where all the valves I to IV normally operate without indicating any abnormalities.

The pressure in the hopper 80 before pressurized is a pressure after the pulverized coal is introduced from a pulverized coal bin (not shown) into the hopper 80, and is therefore the atmospheric pressure. Afterward, the interior of the hopper 80 is sealed and then pressurized with the pressurizing gas, such as nitrogen.

The valve II is opened, and the interior of the hopper 80 is pressurized to a first pressure lower than the target pressure by use of the first buffer tank 87. If the pressure reaches the first pressure, the valve II is closed. The first pressure is set to, for example, 60% or more and 90% or less of the target pressure.

Next, the valve IV is opened, and the interior of the hopper 80 is pressurized to the target pressure (a second pressure) by use of the second buffer tank 88. At this time, since the diameter of the second buffer tank side orifice 88b is larger than the diameter of the first buffer tank side orifice 87b, the pressurizing from the first pressure to the target pressure can be performed immediately.

Note that in the case where the first buffer tank 87 and the second buffer tank 88 can be normally used, the pressurizing of the interior of the hopper 80 by use of the lower part pressure adjustment nitrogen system 83 is not performed. The lower part pressure adjustment nitrogen system 83 is used to fluidize the pulverized coal deposited in the first buffer tank 87 and the second buffer tank 88 when the pulverized coal is discharged.

[Case where the First Buffer Tank 87 is Normal, and the Second Buffer Tank 88 Indicates an Abnormality and is Non-Usable]

Description will be made as to a case where the first buffer tank 87 is normal and the second buffer tank 88 becomes out of order, indicates the abnormality and is determined to be non-usable, e.g., a case where each of the valve I and the valve II is normal, at least one of the valve III and the valve IV becomes out of order, indicates the abnormality and does not operate.

If the control unit 90 detects that at least one of the valve III and the valve IV becomes out of order, indicates the abnormality and does not operate, the control unit determines that the second buffer tank 88 becomes non-usable, and switches to present control. In the present control, the control unit performs pressurizing into the hopper 80 by use of the first buffer tank 87 in combination with pressurizing into the hopper 80 by use of the lower part pressure adjustment nitrogen system 83.

Figure 5:
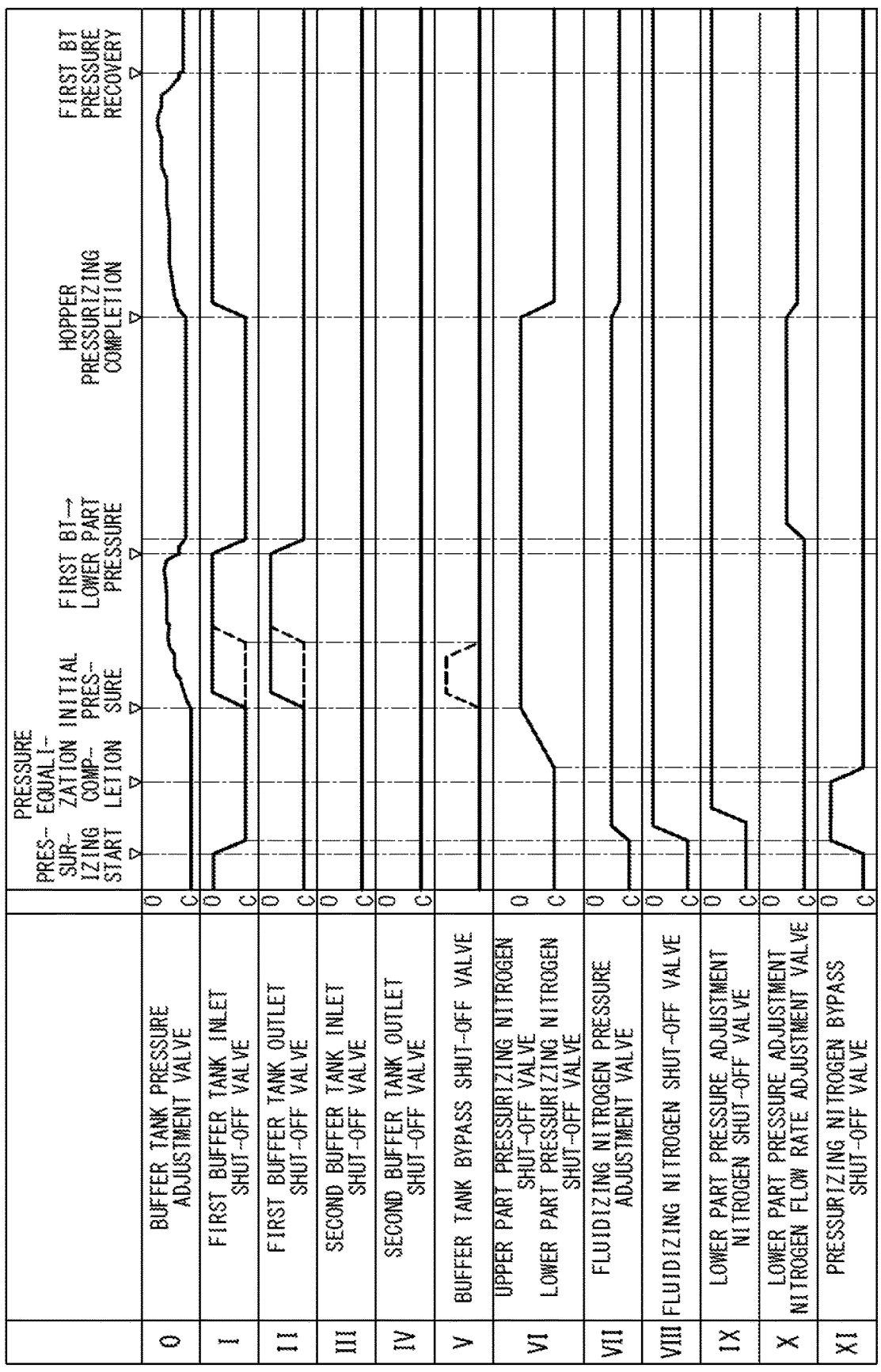
FIG. 5 is a timing chart showing a pressurizing step in a case where a second buffer tank is determined to be non-usable.

As shown in FIG. 5, upon start of the pressurizing into the hopper 80, the valve I is switched from an opened state to a closed state, and the valve XI is switched from the closed state to the opened state. Note that in FIG. 5, "C" means that the valve is in the closed state, and "O" means that the valve is in the opened state. The valve XI is switched to the opened state to supply pressurizing nitrogen remaining in the mother tube 86 from the pressurizing nitrogen bypass system 85 through the upper stage pressurizing nitrogen system 81 and the lower stage pressurizing nitrogen system 82 into the hopper 80, and to equalize a pressure in the mother tube 86 and a pressure in the hopper 80, thereby inhibiting the pressurizing nitrogen remaining in the mother tube 86 from suddenly rushing into the hopper 80.

Upon end of the operation of the valve I and the valve XI, the control unit controls the valve VII and the valve VIII from the closed state to the opened state, and supplies the pressurizing nitrogen into the hopper 80 by use of the fluidizing nitrogen system 84. Furthermore, the valve IX is controlled from the closed state to the open state several seconds after an opening operation of the valve XI ends. After the valve IX is controlled to the opened state, the valve is always in the opened state, thereby decreasing an operation frequency.

Then, upon completion of the equalization of the pressures in the mother tube 86 and the hopper 80, the control unit controls the valve XI from the opened state to the closed state. Afterward, the control unit controls the valve VI-1 and the valve VI-2 from the closed state to the opened state, and prepares for pressurizing by use of the upper stage pressurizing nitrogen system 81 and the lower stage pressurizing nitrogen system 82. For the opening operation at this time, the control unit performs the opening operation by use of a speed controller (not shown) over a predetermined time. This inhibits excessive-speed flow from suddenly rushing into the filters 6a attached to the pressure nozzles 6 (see FIG. 4), to prevent damage.

Upon completion of the opening operation of the valve VI-1 and the valve VI-2, the control unit controls the valve II from the closed state to the opened state to start the pressurizing by the first buffer tank 87. At this time, the control unit also controls the valve I from the closed state to the opened state to supply nitrogen from the ASU. Therefore, opening of the valve O gradually increases.

Note that for the valve V, as shown with a broken line (see FIG. 5, FIG. 6), in a case where the interior of the hopper 80 is not pressurized to a predetermined initial pressure after the equalization of the pressures in the mother tube 86 and the hopper 80, the control unit controls the valve V from the closed state to the opened state, and performs the pressurizing by use of the buffer tank bypass system 89. In a case of performing this pressurizing, the valve I and the valve II are remained in the closed state as shown with the broken line.

Then, if the pressure in the pulverized coal supply hopper 80 reaches the first pressure, the control unit controls the valve I and the valve II from the opened state to the closed state, and also controls the valve X from the closed state to the opened state. Consequently, the pressurizing of the hopper 80 by use of the lower part pressure adjustment nitrogen system 83 starts.

The control unit performs the opening operation of the valve X by use of the speed controller over the predetermined time. This inhibits the excessive-speed flow from suddenly rushing into the filters 6a attached to the pressure nozzles 6 (see FIG. 4), to prevent the damage.

Furthermore, in a case of performing the pressurizing by use of the lower part pressure adjustment nitrogen system 83, the valve O is controlled to a fully closed state. Thus, there is an upper limit amount to the amount of nitrogen to be supplied from the ASU. Consequently, the control unit stops the nitrogen supply from the ASU to the first buffer tank 87, to limit the nitrogen supply to the lower part pressure adjustment nitrogen system 83, thereby avoiding drop in original pressure in the ASU outlet and then shortage of the amount of nitrogen to be supplied.

Then, if the pressure in the hopper 80 reaches the target pressure, the valve VI-1 and the valve VI-2 are controlled to the closed state, and the opening of the valve X is decreased to maintain a constant opening. The opening of the valve X is maintained at a constant value, to perform pressurizing for the conveyance of the pulverized coal by use of the lower part pressure adjustment nitrogen system 83. Furthermore, the opening of the valve VII is also decreased to a predetermined value to maintain the constant opening. Consequently, the fluidizing of the pulverized coal by use of the fluidizing nitrogen system 84 is performed.

Upon end of the pressurizing in the hopper 80, the valve I is controlled from the closed state to the opened state, and the valve O is controlled to the opened state, to perform pressurizing of the first buffer tank 87. If the pressure of the first buffer tank 87 recovers, the valve O is closed to end the pressurizing of the first buffer tank 87.

[Case where the First Buffer Tank Indicates the Abnormality and is Non-Usable, and the Second Buffer Tank is Normal]

Description will be made as to a case where the first buffer tank 87 is non-usable, and the second buffer tank 88 is normal, e.g., a case where at least one of the valve I and the valve II becomes out of order, indicates the abnormality and does not operate, and the valve III and the valve IV are normal.

Upon detecting that at least one of the valve I and the valve II becomes out of order, indicates the abnormality and does not operate, the control unit 90 determines that the first buffer tank 87 is non-usable, and switches to the present control. In the present control, the pressurizing into the hopper 80 by use of the second buffer tank 88 is performed in combination with the pressurizing into the hopper 80 by use of the lower part pressure adjustment nitrogen system 83.

As shown in FIG. 6, upon start of the pressurizing into the hopper 80, the valve III is controlled from the opened state to the closed state, and the valve XI is controlled from the closed state to the opened state. The valve XI is controlled to the opened state, to supply the pressurizing nitrogen remaining in the mother tube 86 from the pressurizing nitrogen bypass system 85 through the upper stage pressurizing nitrogen system 81 and the lower stage pressurizing nitrogen system 82 into the hopper 80, and to equalize the pressures in the mother tube 86 and the hopper 80.

Upon end of the operation of the valve III and the valve XI, the control unit controls the valve VII and the valve VIII from the closed state to the opened state, and supplies the pressurizing nitrogen into the hopper 80 by use of the fluidizing nitrogen system 84. Furthermore, the valve IX is controlled from the closed state to the opened state several seconds after the opening operation of the valve XI ends. The valve IX is controlled to the opened state, and then always in the opened state, thereby decreasing the operation frequency.

Then, upon the completion of the equalization of the pressures in the mother tube 86 and the hopper 80, the control unit controls the valve XI from the opened state to the closed state. Afterward, the control unit controls the valve VI-1 and the valve VI-2 from the closed state to the opened state, and prepares for the pressurizing by use of the upper stage pressurizing nitrogen system 81 and the lower stage pressurizing nitrogen system 82. For the opening operation at this time, the control unit performs the opening operation by use of the speed controller over the predetermined time. This inhibits the excessive-speed flow from suddenly rushing into the filters 6a attached to the pressure nozzles 6 (see FIG. 4), to prevent the damage.

Note that for the valve V, as shown with the broken line (see FIG. 5, FIG. 6), in a case where the interior of the hopper 80 is not pressurized to the predetermined initial pressure after the equalization of the pressures in the mother tube 86 and the hopper 80, the control unit controls the valve V from the closed state to the opened state, and performs the pressurizing by use of the buffer tank bypass system 89.

Upon the completion of the opening operation of the valve VI-1 and the valve VI-2, the control unit controls the valve X from the closed state to the opened state to start the pressurizing by use of the lower part pressure adjustment nitrogen system 83. At this timing, the pressurizing by use of the second buffer tank 88 is not performed, because the diameter of the second buffer tank side orifice 88b is larger than the diameter of the first buffer tank side orifice 87b, and hence there is concern that, if initial pressurizing is performed using the second buffer tank 88, nitrogen of excessive-speed flow suddenly rushes inside to cause damage on the filters 6a. The control unit performs the opening operation of the valve X by use of the speed controller over the predetermined time. This inhibits the excessive-speed flow from suddenly rushing into the filters 6a attached to the pressure nozzles 6 (see FIG. 4), to prevent the damage.

If the pressure in the hopper 80 reaches the predetermined value through the pressurizing by use of the lower part pressure adjustment nitrogen system 83, the control unit controls the valve X from the opened state to the closed state, and controls the valve III and the valve IV from the closed state to the opened state, to switch to the pressurizing by the second buffer tank 88. Then, if the pressure in the hopper 80 reaches the predetermined value, the control unit controls the valve IV from the opened state to the closed state, and controls the valve X from the closed state to the opened state, to switch to the pressurizing by the lower part pressure adjustment nitrogen system 83. At this time, the valve O is controlled to the fully closed state. Thus, there is the upper limit amount to the amount of the nitrogen to be supplied from the ASU. Consequently, the nitrogen supply from the ASU to the first buffer tank 87 is stopped, to limit the nitrogen supply to the lower part pressure adjustment nitrogen system 83, thereby avoiding the drop in original pressure in the ASU outlet and then the shortage of the amount of nitrogen to be supplied.

Then, if the pressure in the hopper 80 reaches the target pressure, the control unit controls the valve VI-1 and the valve VI-2 to the closed state, and decreases the opening of the valve X to maintain the constant opening. The opening of the valve X is maintained at the constant value, to perform the pressurizing for the conveyance of the pulverized coal by use of the lower part pressure adjustment nitrogen system 83. Furthermore, the opening of the valve VII is also decreased to the predetermined value to maintain the constant opening. Consequently, the fluidizing of the pulverized coal by use of the fluidizing nitrogen system 84 is performed.

Upon the end of the pressurizing in the hopper 80, the valve O is controlled from the closed state to the opened state, to perform the pressurizing of the second buffer tank 88. If the pressure of the second buffer tank 88 recovers, the valve O is closed to end the pressurizing of the second buffer tank 88.

[Filter Damage Detection]

The control unit 90 detects the abnormality, such as the damage on the filters 6a (see FIG. 4) as follows. At the tips of the plurality of pressure nozzles 6 provided on the hopper 80, the filters 6a made of, for example, the porous sintered metal having more strength than the metal mesh are provided, respectively. If the damage occurs on the filters 6a due to wear, crack caused by sudden change in gas flow speed or the like, pressure loss in the filters 6a decreases. However, a large number of filters 6a are present, and hence it is not easy to detect the occurrence of the damage on the filters 6a when the damage occurs on one or more filters 6a.

Intense observation done by present inventors, in which a pressure of pressurizing gas on an upstream side of a branch point to supply the pressurizing gas to the plurality of pressure nozzles 6 provided on the hopper 80 is detected by the mother tube pressure sensor P2 and a difference between the pressure and the pressure detected by the hopper pressure sensor P1 continues to be checked, makes it possible to find that there is a change in differential pressure between the mother tube pressure sensor P2 and the hopper pressure sensor P1 in a case where the damage occurs on one or more filters 6a among the large number of existing filters 6a when the pressurizing gas is supplied to the plurality of pressure nozzles 6.

Therefore, the difference between the pressure detected by the hopper pressure sensor P1 and the pressure detected by the mother tube pressure sensor P2 is calculated, and in a case where this differential pressure is equal to or less than a predetermined value, it is determined that the damage occurs on the filters 6a, the pressure loss decreases and the abnormality is indicated. Then, the operator or worker is informed of the damage on the filters 6a by display or voice. Consequently, the operator or worker does not have to visually check whether the damage occurs on the filters 6a, and can prepare replacement parts at appropriate timing.

Note that as the predetermined value that is a criterion in determining the difference, a differential pressure can be set to be between 40% and 80% of a differential pressure at normal time of the filters 6a. When the predetermined value is accurately set, it is preferable to set the value while checking situations of the differential pressure and the filters 6a in a test or the like.

As described above, according to the present embodiment, following operations and effects are produced.

In a case where the first buffer tank 87 or the second buffer tank 88 is determined to be non-usable for a reason that, for example, the tank becomes out of order and indicates the abnormality, the interior of the hopper 80 is pressurized, using the lower part pressure adjustment nitrogen system 83 to supply nitrogen toward the pulverized coal stored in the hopper 80, when supplying the pulverized coal to the burners 126, 127. That is, the lower part pressure adjustment nitrogen system 83 is used to supply the pulverized coal to the burners 126, 127 after the completion of the pressurizing in the hopper 80 and used to additionally supply pulverized coal conveying nitrogen that fluidizes the pulverized coal deposited close to the wall surface of the hopper 80 in a usual operation. The lower part pressure adjustment nitrogen system 83 is also used as a pressurizing gas supply system for the pressurizing in the hopper 80. Consequently, even in a case where one of the first buffer tank 87 or the second buffer tank 88 is determined to be non-usable, the hopper 80 can be pressurized to the target pressure.

The control unit 90 determines that, when the valves I to IV become out of order and indicate the abnormality, the first buffer tank 87 and the second buffer tank 88 connected to the valves are non-usable. Consequently, the control unit 90 can determine that the first buffer tank 87 and the second buffer tank 88 are non-usable, and hence the operator or worker does not have to monitor or judge an operation state.

While the pressurizing in the hopper 80 is performed using the lower part pressure adjustment nitrogen system 83, nitrogen manufactured in the ASU is consumed. At this time, the valve O is controlled to the closed state, and any nitrogen is not guided to the first buffer tank 87 and the second buffer tank 88. Consequently, since there is the upper limit amount to the amount of nitrogen to be supplied from the ASU, nitrogen manufactured in the ASU can be supplied mainly to the lower part pressure adjustment nitrogen system 83, and it can be avoided that the original pressure in the ASU outlet drops and that the nitrogen supply runs short.

The damage might occur on the porous sintered metal filters 6a provided at the tips of the plurality of pressure nozzles 6 provided on the hopper 80, respectively, due to the wear, the crack caused by the sudden change in gas flow speed or the like. Attention is attracted to the differential pressure between the pressures detected by the mother tube pressure sensor P2 of the pressurizing gas of the mother tube 86 on the upstream side of the branch point to supply the pressurizing gas and by the hopper pressure sensor P1 in the powder supply hopper. Consequently, it can be found that this differential pressure changes when the damage occurs on one or more filters 6a among the plurality of existing filters 6a. Therefore, in a case where the differential pressure between the pressure in the hopper 80 and the pressure of the pressurizing gas is equal to or less than the predetermined value, it is determined that the damage occurs on the filters 6a. In consequence, the operator or worker does not have to visually check whether the damage occurs on the filters 6a, and can prepare the replacement parts at the appropriate timings.

Note that in the above described embodiment, the pulverized coal is described as the example of the powder fuel, but the present invention is not limited to this example, and can be applied also to another type of powder fuel such as pulverized biomass fuel or char.

The buffer tank bypass system 89 is used to compensate for a pressurizing shortage, but the pressurizing can be adjusted with the valve X of the lower part pressure adjustment nitrogen system 83, and hence the buffer tank bypass system 89 may be omitted.

REFERENCE SIGNS LIST 1 pulverized coal supply hopper pressurizing apparatus (a powder supply hopper pressurizing apparatus)
6 pressure nozzle
6a filter
10 integrated coal gasification combined cycle (integrated gasification combined cycle)
11 coal supply unit
11a coal supply line
14 gasifier unit
15 char recovery unit
16 gas clean-up unit
17 gas turbine
18 steam turbine
19 generator
20 heat recovery steam generator
41 compressed air supply line
42 air separation unit
43 first nitrogen supply line
45 second nitrogen supply line
46 char return line
47 oxygen supply line
49 gas generation line
51 dust collection unit
52 supply hopper
53 gas discharge line
61 compressor
62 combustor
63 turbine
64 rotary shaft
65 compressed air supply line
66 fuel gas supply line
67 combustion gas supply line
68 booster
69 turbine 70 flue gas line
71 steam supply line
72 steam recovery line
74 gas purification unit
75 stack
80 pulverized coal supply hopper (a powder supply hopper)
81 upper stage pressurizing nitrogen system
82 lower stage pressurizing nitrogen system
83 lower part pressure adjustment nitrogen system (a gas supply system)
84 fluidizing nitrogen system
85 pressurizing nitrogen bypass system
86 mother tube
87 first buffer tank
87a first buffer tank side nitrogen system
87b first buffer tank side orifice
88 second buffer tank
88a second buffer tank side nitrogen system
88b second buffer tank side orifice
89 buffer tank bypass system
89b bypass side orifice
90 control unit
101 gasifier
102 syngas cooler
110 pressure vessel
111 gasifier wall
115 annulus part
116 combustor part
117 diffusor part
118 reductor part
121 gas discharge port
122 slag bath
126 burner
127 burner
131 evaporator
132 superheater
134 economizer
154 internal space
156 external space
O buffer tank pressure adjustment valve
I first buffer tank inlet shut-off valve
II first buffer tank outlet shut-off valve
III second buffer tank inlet shut-off valve
IV second buffer tank outlet shut-off valve
V buffer tank bypass shut-off valve
VI-1 upper part pressurizing nitrogen shut-off valve
VI-2 lower part pressurizing nitrogen shut-off valve
VII fluidizing nitrogen pressure adjustment valve
VIII fluidizing nitrogen shut-off valve
IX lower part pressure adjustment nitrogen shut-off valve
X lower part pressure adjustment nitrogen flow rate adjustment valve
XI pressurizing nitrogen bypass shut-off valve
P1 hopper pressure sensor (a powder supply hopper pressure sensor)
P2 mother tube pressure sensor (a pressurizing gas pressure sensor)

The invention claimed is:

1. A powder supply hopper pressurizing apparatus, comprising:
   a first buffer tank in which pressurizing gas to be supplied to a powder supply hopper that supplies pressurized powder fuel is configured to be accumulated at a predetermined pressure,
   a second buffer tank that is provided in parallel with the first buffer tank and in which the pressurizing gas to be supplied to the powder supply hopper is configured to be accumulated at a predetermined pressure,
   a gas supply system connected to the powder supply hopper, configured to supply the pressurizing gas toward the powder fuel stored in the powder supply hopper when supplying the pressurized powder fuel,
   a pressurizing gas manufacturing device that is configured to supply the pressurizing gas to the first buffer tank, the second buffer tank and the gas supply system,
   a first buffer tank inlet valve provided on a pressurizing gas manufacturing device side of the first buffer tank,
   a first buffer tank outlet valve provided on a powder supply hopper side of the first buffer tank,
   a second buffer tank inlet valve provided on a pressurizing gas manufacturing device side of the second buffer tank,
   a second buffer tank outlet valve provided on a powder supply hopper side of the second buffer tank, and
   a control unit programmed to control the first buffer tank to pressurize the powder supply hopper to a first pressure and to control the second buffer tank to pressurize the powder supply hopper to a second pressure, wherein
   in a case where the control unit determines that one of the first buffer tank or the second buffer tank is non-usable, the control unit is programmed to pressurize the powder supply hopper by use of the first buffer tank or the second buffer tank that is operable, and the gas supply system, and
   the control unit is programmed to determine that the first buffer tank is non-usable when the first buffer tank inlet valve or the first buffer tank outlet valve becomes out of order, indicates an abnormality, and does not operate, and to determine that the second buffer tank is non-usable when the second buffer tank inlet valve or the second buffer tank outlet valve becomes out of order, indicates an abnormality, and does not operate.

2. The powder supply hopper pressurizing apparatus according to claim 1, further comprising a buffer tank pressure adjustment valve provided between the pressurizing gas manufacturing device, and the first buffer tank inlet valve and the second buffer tank inlet valve, to adjust a pressure to be supplied to the first buffer tank and the second buffer tank, wherein
   the control unit is programmed to control the buffer tank pressure adjustment valve to a closed state, when pressurizing the powder supply hopper by use of at least the gas supply system.

3. The powder supply hopper pressurizing apparatus according to claim 1, further comprising:
   a plurality of pressure nozzles configured to supply the pressurizing gas to the powder supply hopper,
   a plurality of filters provided at tips of the pressure nozzles, respectively, to face a space of the powder supply hopper in which the powder fuel is stored and configured to pass the pressurizing gas therethrough,
   a powder supply hopper pressure sensor configured to detect a pressure in the powder supply hopper, and
   a pressurizing gas pressure sensor configured to detect a pressure on an upstream side of a branch point of the pressurizing gas to be branched at the branch point and supplied to the pressure nozzles, wherein
   the control unit is programmed to determine that damage occurs on the filters, in a case where a differential pressure between the pressure detected by the powder supply hopper pressure sensor and the pressure detected by the pressurizing gas pressure sensor is equal to or less than a predetermined value.

4. A gasifier unit comprising:
the powder supply hopper pressurizing apparatus according to claim 1, and
a gasifier to which the powder fuel is supplied from the powder supply hopper pressurizing apparatus.

5. An integrated gasification combined cycle comprising:
the gasifier unit according to claim 4,
a gas turbine configured to combust at least a part of raw syngas obtained by the gasifier unit to rotate and drive,
a steam turbine configured to rotate and to drive with steam generated by a heat recovery steam generator into which turbine flue gas discharged from the gas turbine is introduced, and
a generator rotatably coupled to the gas turbine and/or the steam turbine.

6. A control method of a powder supply hopper pressurizing apparatus comprising:
a first buffer tank in which pressurizing gas to be supplied to a powder supply hopper that supplies pressurized powder fuel is configured to be accumulated at a predetermined pressure,
a second buffer tank that is provided in parallel with the first buffer tank and in which the pressurizing gas to be supplied to the powder supply hopper is configured to be accumulated at a predetermined pressure,
a gas supply system connected to the powder supply hopper, configured to supply the pressurizing gas toward the powder fuel stored in the powder supply hopper when supplying the pressurized powder fuel,
a pressurizing gas manufacturing device that is configured to supply the pressurizing gas to the first buffer tank, the second buffer tank and the gas supply system,
a first buffer tank inlet valve provided on a pressurizing gas manufacturing device side of the first buffer tank,
a first buffer tank outlet valve provided on a powder supply hopper side of the first buffer tank,
a second buffer tank inlet valve provided on a pressurizing gas manufacturing device side of the second buffer tank, and
a second buffer tank outlet valve provided on a powder supply hopper side of the second buffer tank,
the control method of the powder supply hopper pressurizing apparatus, comprising:
controlling the first buffer tank to pressurize the powder supply hopper to a first pressure, and then controlling the second buffer tank to pressurize the powder supply hopper to a second pressure, and
in a case where it is determined that the powder supply hopper cannot be pressurized to the first pressure by use of the pressurizing gas accumulated in the first buffer tank, pressurizing the powder supply hopper to the second pressure by use of the second buffer tank and the gas supply system, and
in a case where it is determined that the powder supply hopper cannot be pressurized to the second pressure by use of the pressurizing gas accumulated in the second buffer tank, pressurizing the powder supply hopper to the second pressure by use of the first buffer tank and the gas supply system,
determining that the first buffer tank is non-usable when the first buffer tank inlet valve or the first buffer tank outlet valve becomes out of order, indicates an abnormality, and does not operate, and
determining that the second buffer tank is non-usable when the second buffer tank inlet valve or the second buffer tank outlet valve becomes out of order, indicates an abnormality, and does not operate.

* * * * *